(12) United States Patent
Nakai et al.

(10) Patent No.: US 11,117,830 B2
(45) Date of Patent: Sep. 14, 2021

(54) GLASS ARTICLE WITH COLORED COATING

(71) Applicant: CENTRAL GLASS COMPANY, LIMITED, Ube (JP)

(72) Inventors: Nobuyuki Nakai, Matsusaka (JP); Yoshihiko Obara, Matsusaka (JP)

(73) Assignee: CENTRAL GLASS COMPANY, LIMITED, Ube (JP)

( * ) Notice: Subject to any disclaimer, the term of this patent is extended or adjusted under 35 U.S.C. 154(b) by 0 days.

(21) Appl. No.: 16/467,334

(22) PCT Filed: Oct. 2, 2017

(86) PCT No.: PCT/JP2017/035797
§ 371 (c)(1),
(2) Date: Jun. 6, 2019

(87) PCT Pub. No.: WO2018/105212
PCT Pub. Date: Jun. 14, 2018

(65) Prior Publication Data
US 2020/0071226 A1    Mar. 5, 2020

(30) Foreign Application Priority Data

Dec. 7, 2016   (JP) .............................. JP2016-237208

(51) Int. Cl.
    *C03C 17/00*    (2006.01)
    *B60J 1/02*    (2006.01)
    *B32B 3/26*    (2006.01)

(52) U.S. Cl.
    CPC ............ *C03C 17/007* (2013.01); *B32B 3/263* (2013.01); *B60J 1/02* (2013.01); *C03C 17/008* (2013.01);
    (Continued)

(58) Field of Classification Search
    CPC ..... Y10T 428/24479; Y10T 428/24488; Y10T 428/24612; Y10T 428/24942;
    (Continued)

(56) References Cited

U.S. PATENT DOCUMENTS 5,556,667 A * 9/1996 Teranishi ................. B05D 1/32
                                                   427/164
6,461,704 B1   10/2002 Matsco et al.
(Continued)

FOREIGN PATENT DOCUMENTS

GB       822295 A      10/1959
JP       S60-63537 U    5/1985
(Continued)

OTHER PUBLICATIONS

Machine translation (Espacenet) of JP 2016-055828 A. Translated Dec. 9, 2020. (Year: 2020).*
(Continued)

*Primary Examiner* — Frank J Vineis
*Assistant Examiner* — Ethan A. Utt
(74) *Attorney, Agent, or Firm* — Osha Bergman Watanabe & Burton LLP

(57) ABSTRACT

A glass article includes a glass substrate, a colored film formed on one of main surfaces of the glass substrate, an uncoated portion where no colored film is formed which is present in part of the one of main surfaces or on an edge face of the glass substrate, a boundary between the colored film and the uncoated portion, and a film thickness varying portion where the colored film gradually tapers in thickness toward the boundary. The uncoated portion is visible in the glass article used as a window, the glass substrate has an absorbance in the wavelength range of 380 nm to 780 nm of
(Continued)

0.10 or lower per mm of thickness, and the glass article has a portion blue in color, gray in color, or pink in color where the colored film is formed.

8 Claims, 3 Drawing Sheets

(52) U.S. Cl.
CPC ... *C03C 2217/74* (2013.01); *Y10T 428/24612* (2015.01)

(58) Field of Classification Search
CPC ....... Y10T 428/2495; Y10T 428/24967; Y10T 428/24975; Y10T 428/26; Y10T 428/261; Y10T 428/263; Y10T 428/264; Y10T 428/265; Y10T 428/266; Y10T 428/269; Y10T 428/27; Y10T 428/273; Y10T 428/31511; Y10T 428/31515; Y10T 428/31518; Y10T 428/31525; Y10T 428/31616; Y10T 428/3162; Y10T 428/31627; Y10T 428/31645; Y10T 428/31649; Y10T 428/31663; Y10T 428/31667; Y10T 428/31551; Y10T 428/31554; Y10T 428/31565; Y10T 428/31573; Y10T 428/31576; Y10T 428/31594; Y10T 428/31598; Y10T 428/31601; Y10T 428/3176; Y10T 428/31794; Y10T 428/31797; Y10T 428/31855; Y10T 428/31859; Y10T 428/31862; Y10T 428/3187; Y10T 428/31873; Y10T 428/13909; Y10T 428/31928; Y10T 428/31935; Y10T 428/31942; Y10T 428/31946; B32B 3/00; B32B 3/26; B32B 3/263; B32B 17/00; B32B 17/06; B32B 17/064; B32B 17/10; B32B 17/10009; B32B 17/10018; B32B 17/10082; B32B 17/1011; B32B 17/10165; B32B 17/10339; B32B 17/10348; B32B 17/10357; B32B 17/13055; B32B 17/10559; B32B 17/10568; B32B 17/10651; B32B 17/1066; B32B 17/10678; B32B 17/10715; B32B 17/10733; B32B 17/10743; B32B 17/1077; B32B 17/10779; B32B 17/10798; B32B 27/00; B32B 27/06; B32B 27/08; B32B 27/18; B32B 27/20; B32B 27/24; B32B 27/28; B32B 27/283; B32B 27/285; B32B 27/30; B32B 27/308; B32B 27/36; B32B 27/38; B32B 27/40; B32B 27/42; B32B 2255/00; B32B 2255/26; B32B 2255/28; B32B 2307/40; B32B 2307/402; B32B 2307/4026; B32B 2307/412; B32B 2419/00; B32B 2605/00; B32B 2605/006; C03C 17/00; C03C 17/22; C03C 17/23; C03C 17/25; C03C 17/28; C03C 17/30; C03C 17/32; C03C 17/322; C03C 17/324; C03C 17/326; C03C 17/34; C03C 17/3405; C03C 17/3411; C03C 2217/00; C03C 2217/20; C03C 2217/21; C03C 2217/228; C03C 2217/70; C03C 2217/74; E06B 3/00; E06B 3/66; E06B 3/67; E06B 5/00; B60J 1/00; B60J 1/02; B60J 1/08; B60J 1/18; B60J 3/00; B60J 3/007
USPC ....... 428/156, 157, 172, 212, 213, 215, 216, 428/219, 220, 332–337, 339–341, 428/413–415, 417, 426, 428–432, 436, 428/441, 442, 446–448, 451, 423.1, 428/423.3, 423.7, 424.2, 425.3, 425.5, 428/425.6, 480, 482, 483, 500–505, 515, 428/520, 522, 524, 525
See application file for complete search history.

(56) References Cited

U.S. PATENT DOCUMENTS

| | | | |
|---|---|---|---|
| 2004/0161614 A1 | 8/2004 | Athey et al. | |
| 2009/0007490 A1* | 1/2009 | Muromachi | C03C 17/366 49/70 |
| 2009/0080066 A1* | 3/2009 | Muromachi | C03C 17/366 359/359 |
| 2010/0035067 A1* | 2/2010 | Colton | C09D 7/61 428/425.5 |
| 2015/0253486 A1* | 9/2015 | Verger | G02B 6/0035 362/606 |

FOREIGN PATENT DOCUMENTS

| | | | |
|---|---|---|---|
| JP | 2012-180260 A | | 9/2012 |
| JP | 2013-129576 A | | 7/2013 |
| JP | 2014111453 A | * | 6/2014 |
| JP | 2015-34281 A | | 2/2015 |
| JP | 2016055828 A | * | 4/2016 |
| JP | 2016084276 A | * | 5/2016 |
| JP | 2017-13043 A | | 1/2017 |

OTHER PUBLICATIONS

H. Kodaira., "High performance UV cut tempered automotive glass", New Glass, 2012, vol. 27, No. 104, pp. 70-74 (5 pages).
International Search Report issued in International Application No. PCT/JP2017/035797, dated Jan. 9, 2018 (5 pages).
Written Opinion issued in International Application No. PCT/JP2017/035797, dated Jan. 9, 2018 (12 pages).
Extended European Search Report issued in European Application No. 17878705.7, dated Jul. 27, 2020 (5 pages).

* cited by examiner

GLASS ARTICLE WITH COLORED COATING

TECHNICAL FIELD

The present invention relates to colored film-coated glass articles that are to be incorporated as windows in buildings or vehicles.

BACKGROUND ART

A technique has been developed to improve the hardness of a film formed by application on the surface of a glass substrate. Owing to such a technique, glasses on which a film is formed by application have been used as windowpanes in automobiles, such as door glasses that move in the frames (see, for example, Non-Patent Literature 1). Patent Literature 1 discloses UV absorbing high hardness films for windowpanes. When a film is formed by application, the components in the film can be controlled relatively freely. Thus, the films containing other components as proposed in Patent Literature 1 are expected to have various functions. For example, a film containing a pigment can be a colored film.

In the case of a door glass, the portion close to the upper end of the glass is rubbed by the frame, and also, the portion close to the upper end is visible. For such a case, it has been proposed that no film is formed on the portion close to the upper end to form an uncoated portion. Thereby, scratching of the film is prevented (see Patent Literature 2).

CITATION LIST

Patent Literature

Patent Literature 1: JP 2015-34281 A
Patent Literature 2: JP 2013-129576 A

Non-Patent Literature

Non-Patent Literature 1: "High performance UV cut tempered automotive glass", NEW GLASS, Vol. 27, No. 104, 2012

Technical Problem

In a glass article including a glass substrate and a film formed on a main surface of the glass substrate, when no film is formed on the portion close to the upper edge of the main surface of the glass substrate, for example, a boundary is created between the film and the edge of the glass substrate (cut surface or cut surface polished) or a portion where no film is formed continuously from the edge (uncoated portion). Even when an uncoated portion is not formed on the main surface, the edge of the glass substrate (cut surface or cut surface polished) is an uncoated portion. Thus, a boundary is created between edge of the glass substrate and the film formed on the main surface of the glass substrate.

When the film is colored, the color difference between the colored film and a portion where no film is formed, that is, an uncoated portion, is easily visible. Thus, the boundary is likely to be noticeable. In a glass article that is incorporated as a window in a building or vehicle and includes a visible uncoated portion, a noticeable boundary is unfavorable in view of fine appearance. However, making the boundary less noticeable is difficult as long as the film is colored.

Considering the above description, an object of the present invention is to improve the appearance of a colored film-coated glass article that is to be incorporated as a window in a building or vehicle.

Solution to Problem

The glass article of the present invention relates to a colored film-coated glass article that is to be incorporated as a window in a building or vehicle, the glass article including:
a glass substrate;
a colored film formed on one of main surfaces of the glass substrate;
an uncoated portion where no colored film is formed which is present in part of the one of main surfaces or on an edge face of the glass substrate;
a boundary between the colored film and the uncoated portion; and
a film thickness varying portion where the colored film gradually tapers in thickness toward the boundary,
the uncoated portion being visible in the glass article used as a window,
the glass substrate having an absorbance in the wavelength range of 380 nm to 780 nm of 0.10 or lower per mm of thickness,
the portion where the colored film is formed being blue in color, gray in color, or pink in color in the glass article.

The glass substrate having an absorbance in the wavelength range of 380 nm to 780 nm of 0.10 or lower per mm of thickness is a glass substrate having a high visible light transmittance, such as a substantially colorless clear glass substrate or a slightly green colored glass substrate. Such a glass substrate is widely used in buildings or vehicles. The color of the glass article greatly depends on the color of the film.

The absorbance can be calculated according to Lambert's law using the following equation.

$$\text{Absorbance of glass substrate} = \text{Log}_{10}(I_0/I) = a \times l$$

$I_0$=Intensity of incident light
$I$=Intensity of transmitted light
$a$=Absorbance per mm of thickness
$l$=Optical path length In the glass article including the film thickness varying portion and in which a portion where the colored film is formed is blue in color, gray in color, or pink in color, the boundary is less noticeable. Thus, the appearance of the glass article is improved.

The phrase "blue in color" means coloring with blue, blue-green, light blue, or navy blue observable to the human eyes. Preferably, the chromaticity in the L*a*b* color system can satisfy a*<0 and b*<0 in the center portion of the glass article. The phrase "gray in color" means a color between black and colorless. Preferably, the lightness L* and the chroma c* in the L*a*b* color system can satisfy 85<L*<90 and c*<7, respectively, in the center portion of the glass article. The phrase "pink in color" in the invention means a color of red with high lightness and low chroma and light pink. Preferably, the lightness L* and the chroma c* in the L*a*b* color system can satisfy 88<L*<93 and c*<10, respectively, in the center portion of the glass article.

Advantageous Effects of Invention

The present invention can provide a colored film-coated glass article that is to be incorporated as a window in a building or vehicle, in which the color difference between the uncoated portion and the colored film is less noticeable, and thus provides a colored film-coated glass article having improved appearance.

DESCRIPTION OF EMBODIMENTS

Figure 1:
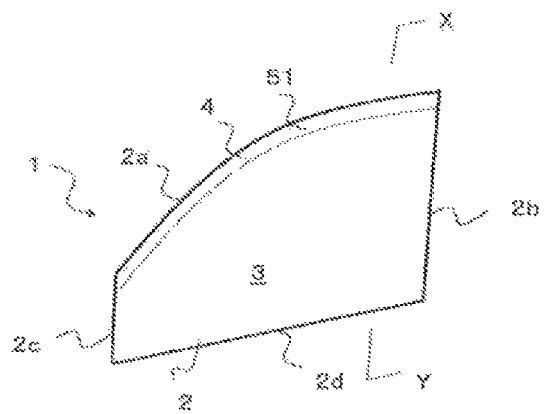
FIG. 1 is a schematic front view of a main part of a glass article according to a first embodiment of the present invention.
Figure 2:
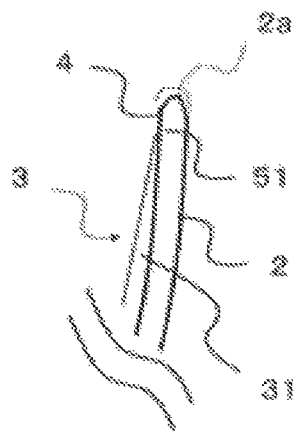
FIG. 2 is a schematic view of a main part of the X-Y cross section in FIG. 1.

The glass article of the present invention is described with reference to the figures. FIG. 1 is a schematic front view of the main part of the glass article according to the first embodiment. FIG. 2 is a schematic view of a main part of the X-Y cross section in FIG. 1.

A glass article 1 includes a glass substrate 2 and a colored film 3 formed on a main surface of a glass substrate. In the glass article 1 according to the first embodiment, the glass substrate 2 includes an upper edge 2a, side edges 2b and 2c, and a lower edge 2d. When the glass article 1 is incorporated as a door glass in a vehicle such as an automobile, the glass article 1 is raised and lowered in the frame of the door glass. Thus, the edge face of the upper edge 2 is visible. The upper edge 2a, side edges 2b and 2c, and lower edge 2d each may have a cut surface or a cut surface polished.

In the glass article 1 according to the first embodiment as shown in FIG. 2, the portion close to the upper edge of the main surface that is continuous from the upper edge 2a is an uncoated portion 4 where no colored film is formed. The uncoated portion 4 and a boundary 51 between the colored film 3 and the uncoated portion 4 are visible to a person like the upper edge 2a when the glass article 1 is incorporated as a door glass in a vehicle such as an automobile.

The colored film 3 includes a film thickness varying portion 31 where the colored film gradually tapers in thickness toward the boundary 51. The colored film in the center portion of the glass article 1 preferably has a thickness of 1.5 µm to 8 µm. When the thickness of the colored film is less than 1.5 µm, the color development of the film tends to be reduced. To maintain the color development requires an increase in the amount of the pigment, which is however likely to lead to poor durability of the film. When the thickness of the colored film is greater than 8 µm, the durability of the film tends to be reduced. In light of these, the thickness of the colored film is preferably 2 µm to 7 µm, more preferably 2.5 µm to 6 µm.

The members are described in detail below.

<1> Glass Substrate 2

The glass substrate 2 is a glass plate that has an absorbance in the wavelength range of 380 nm to 780 nm of 0.10 or lower per mm of thickness. It may be a glass plate produced by a float method, a duplex method, or a roll-out method, for example. The glass substrate 2 is to be incorporated as a window in a building or vehicle and has a predetermined shape suitable for windows.

The glass plate having an absorbance in the wavelength range of 380 nm to 780 nm of 0.10 or lower per mm of thickness is colorless or pale colored, but is substantially colorless, when viewed from the main surface. Examples of the above-mentioned glass plate include clear glass plates and slightly green colored glass plates, which are widely used as automobile front windshields and side windows or windowpanes in buildings. The glass plate having an absorbance in the wavelength range of 380 nm to 780 nm of 0.10 or lower per mm of thickness can achieve good color development of the glass article 1 owing to the colored film 3. That is, the glass plate can reflect the color of the colored film 3 on the glass article 1. To enhance the color development of the glass article 1, the glass substrate 2 may be a glass plate having an absorbance in the wavelength range of 380 nm to 780 nm of 0.02 or lower per mm of thickness. Examples of such a glass plate include clear glass plates.

The glass substrate 2 may have any thickness. For example, the glass substrate 2 may be a glass plate having a thickness of 0.3 to 15 mm, 0.5 to 5 mm, or 1 to 3 mm between the main surfaces parallel to each other. The glass substrate 2 may be a glass plate widely used in a building or vehicle such as an automobile, produced by a float method, a duplex method, or a roll-out method, for example. When the glass article 1 of the present invention is incorporated in a vehicle, the edge face of the glass substrate 2 may be polished into the R shape.

The main surface of the glass substrate 2 is desirably cleaned by washing and dried before the formation of the colored film 3. For example, the washing may be performed by a known washing method such as using an abrasive (e.g., cerium oxide), brushing, showering, or high pressure showering. The drying may be performed by a known drying method such as natural drying or air showering. Alternatively, a dry process washing may be performed using atmospheric plasma or UV ozone.

2. Colored Film 3

The colored film 3 may be formed on a main surface of the glass substrate 2 through the following steps of, for example:

preparing a colored film-forming application liquid (hereinafter, also referred to as "primary application liquid") by mixing the following components (a) to (f):

(a) a reaction product obtained by reacting an amino group-containing silane compound represented by $R^1_{4-n}Si(OR^2)_n$ [1] (wherein $R^1$ is an amino group-containing organic group, $R^2$ is a methyl, ethyl, or propyl group, and n is an integer selected from 1 to 3) with at least one boron compound selected from the group consisting of $H_3BO_3$ and $B_2O_3$;

(b) a metal alkoxide and/or a condensation product of a metal alkoxide;

(c) a synthetic resin;

(d) a triazine ultraviolet absorber having a SP value of 10 to 13.5 $(cal/cm^3)^{1/2}$;

(e) a solvent including a non-aqueous solvent substantially having a SP value of 8 to 11.5 $(cal/cm^3)^{1/2}$; and (f) a blue, gray, or pink pigment;

applying the film-forming application liquid to the glass plate surface to form a coat; and curing the coat by heating the glass plate after the application step to form a film.

The following specifically describes the steps and the structure of the glass article obtained through the steps.

2.1. Preparation of Colored Film-Forming Application Liquid (Primary Application Liquid)

2.1.1. Component (a)

When an amino group-containing silane compound represented by $R^1_{4-n}Si(OR^2)_n$ [1] (wherein $R^1$ is an amino group-containing organic group, $R^2$ is a methyl, ethyl, or propyl group, and n is an integer selected from 1 to 3) is mixed with at least one boron compound selected from the group consisting of $H_3BO_3$ and $B_2O_3$, they react with each other and turn into a transparent viscous liquid in several minutes to several tens of minutes and the liquid is then solidified. This is because the boron compound serves as a crosslinking agent between the amino groups of the amino group-containing silane compound to cause polymerization of these compounds. Thus, these compounds turn into a viscous liquid and the liquid is solidified. The amino group-containing silane compound is liquid. No water is preferably used in the reaction between the amino group-containing silane compound and the boron compound. In the amino group-containing silane compound, $R^1$ is an amino group-containing organic group. Non-limiting examples thereof include monoaminomethyl, diaminomethyl, triaminomethyl, monoaminoethyl, diaminoethyl, triaminoethyl, tetraaminoethyl, monoaminopropyl, diaminopropyl, triaminopropyl, tetraaminopropyl, monoaminobutyl, diaminobutyl, triaminobutyl, and tetraaminobutyl groups, and organic groups having an alkyl or aryl group that contains a greater number of carbon atoms than the foregoing groups. Particularly preferred are γ-amino propyl and aminoethyl aminopropyl, with γ-amino propyl being most preferred.

$R^2$ is a methyl, ethyl, or propyl group. Preferred among these are methyl and ethyl groups. The subscript n is an integer selected from 1 to 3, preferably an integer of 2 or 3, particularly preferably an integer of 3. That is, the amino group-containing silane compound is particularly preferably γ-aminopropyltriethoxysilane or N-β-(aminoethyl)-γ-aminopropyltrimethoxysilane. The boron compound is at least one boron compound selected from the group consisting of $H_3BO_3$ and $B_2O_3$. Particularly preferred is $H_3BO_3$.

Regarding the amounts of the amino group-containing silane compound and the boron compound used in the reaction, the amount of the boron compound is preferably 0.02 to 8 mol, more preferably 0.02 to 5 mol, still more preferably 0.2 to 5 mol per mole of the amino group-containing silane compound in light of reaction rate.

The mixing conditions (e.g., temperature, mixing time, mixing method) of the amino group-containing silane compound and the boron compound may be appropriately selected. Under ordinary room temperature conditions, these compounds react and turn into a transparent, viscous liquid in several minutes to several tens of minutes and the liquid is solidified. The time required for the solidification and the viscosity and rigidity of the obtained reaction product vary depending on the proportion of the boron compound. The reaction product in the form of a viscous liquid is better than that in the form of a solid because the reaction product in the form of a viscous liquid is easily present as a component stably dissolved in the application liquid. The reaction product is preferably obtained by reaction of the amino group-containing silane compound and the boron compound without hydrolysis by adding water.

2.1.2. Component (b)

A metal alkoxide and/or a condensation product of a metal alkoxide are/is added as a component (b) to the reaction product. Specifically, the component (b) is added during or after the reaction of the amino group-containing silane compound and the boron compound. The addition of the component (b) can provide a colored film having an enhanced hardness and also can provide a viscous liquid like the reaction product to which no component (b) is added. Thus, these components can be stably dissolved in the application liquid.

Non-limiting examples of the metal in the metal alkoxide as the component (b) include Si, Ta, Nb, Ti, Zr, Al, Ge, B, Na, Ga, Ce, V, Ta, P, and Sb. Preferred are Si, Ti, and Zr. Particularly preferred are Si and Ti because the component (b) is preferably liquid. Examples of the alkoxide (alkoxyl group) in the metal alkoxide as the component (b) include methoxy, ethoxy, propoxy, and butoxy groups, and other alkoxyl groups each containing a greater number of carbon atoms than the foregoing groups. Preferred are methoxy, ethoxy, propoxy, and butoxy groups, with methoxy and ethoxy groups being more preferred. The component (b) is particularly preferably tetramethoxysilane or tetraethoxysilane, for example.

Specific examples of the metal alkoxide as the component (b) include tetramethoxysilane, tetraethoxysilane, tetrapropoxysilane, tetrabutoxysilane, methyltrimethoxysilane, ethyltriethoxysilane, propyltripropoxysilane, butyltributoxysilane, tetramethoxytitanium, tetraethoxytitanium, tetrapropoxytitanium, tetrabutoxytitanium, methyltrimethoxytitanium, ethyltriethoxytitanium, propyltripropoxytitanium, butyltributoxytitanium, tetramethoxyzirconium, tetraethoxyzirconium, tetrapropoxyzirconium, tetrabutoxyzirconium, methyltrimethoxyzirconium, ethyltriethoxyzirconium, propyltripropoxyzirconium, and butyltributoxyzirconium. Preferred among these are tetraethoxysilane, tetramethoxysilane, ethyltriethoxysilane, and methyltrimethoxysilane.

The amount of the metal alkoxide as the component (b) is preferably 10 mol or less, more preferably 0.1 to 5 mol, per mole of the amino group-containing silane compound. When the amount of the component (b) is less than 0.1 mol per mole of the amino group-containing silane compound or per mole of the boron compound, the effects of addition of the component (b) may be less likely to be obtained. When the amount of the component (b) is more than 5 mol, the resulting liquid may become cloudy.

The condensation product of a metal alkoxide as the component (b) may be represented by at least one formula selected from the group consisting of the formulas (b1) and (b2).

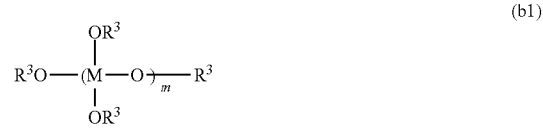

(b1)

(b2)

In each formula, $R^3$s are independently the same as or different from one another and may be alkyl groups, part of which may be hydrogen; m is an integer selected from 2 to 20; and M is at least one metal selected from the group consisting of Si, Ti, and Zr.

The condensation product of a metal alkoxide as the component (b) is added in an amount such that the mass of the metal alkoxide monomer is preferably 2 to 50 mol, more preferably 4 mol or more relative to 11 mol of the amino group-containing silane compound. When the amount of the component (b) is too large, the resulting film tends to have a low hardness. On the other hand, when the amount of the component (b) is too small, the resulting film may have a low hardness or a problem of the chemical durability, in some applications, due to the low metal element content. When the amount of the component (b) is too large, the time required for curing the colored film of the present invention tends to be long.

$R^3$s in the condensation product of a metal alkoxide as the component (b) are independently the same as or different from one another and may be alkyl groups, part of which may be hydrogen. Each $R^3$ is a methyl, ethyl, propyl, or butyl group, or an alkyl group containing a greater number of carbon atoms than the foregoing groups. Preferred are methyl and ethyl groups. The subscript m in the condensation product of a metal alkoxide as the component (b) is an integer selected from 2 to 20, preferably selected from 3 to 10. The subscript m is most preferably 5. M in the condensation product of a metal alkoxide as the component (b) is at least one metal selected from the group consisting of Si, Ti, and Zr. Preferred are Si and Ti, with Si being most preferred.

Examples of the metal alkoxide monomer unit constituting the condensation product of a metal alkoxide as the component (b) include tetramethoxysilane, tetraethoxysilane, tetrapropoxysilane, tetrabutoxysilane, methyltrimethoxysilane, ethyltriethoxysilane, propyltripropoxysilane, butyltributoxysilane, tetramethoxytitanium, tetraethoxytitanium, tetrapropoxytitanium, tetrabutoxytitanium, methyltrimethoxytitanium, ethyltriethoxytitanium, propyltripropoxytitanium, butyltributoxytitanium, tetramethoxyzirconium, tetraethoxyzirconium, tetrapropoxyzirconium, tetrabutoxyzirconium, methyltrimethoxyzirconium, ethyltriethoxyzirconium, propyltripropoxyzirconium, and butyltributoxyzirconium.

The component (b) represented by the formula (b1) is preferably a condensation product of tetraethoxysilane (pentamer) or a condensation product of tetramethoxysilane (pentamer). The component (b) represented by the formula (b2) is preferably a condensation product of ethyltriethoxysilane (pentamer) or a condensation product of methyltrimethoxysilane (pentamer).

As described above, a metal alkoxide (monomer) and/or a condensation product of a metal alkoxide as the component (b) are/is added to the reaction product of the present invention. The viscosity of the metal alkoxide monomer is lower than that of the condensation product of the metal alkoxide monomer. Thus, the addition of the metal alkoxide monomer may provide an application liquid having an enhanced applicability. However, when the amount of the metal alkoxide monomer is increased to an amount equal to or greater than the amount of the condensation product of the metal alkoxide monomer, the viscosity of the application liquid is likely to be low. This tends to cause liquid dripping of the application liquid when it is applied.

2.1.3. Component (c)

A synthetic resin (component (c)) is added to the reaction product. Specifically, a synthetic resin (component (c)) is added during or after the reaction between the amino group-containing silane compound and the boron compound. The addition of the component (c) can provide a crack-resistant colored film.

Non-limiting examples of the synthetic resin as the component (c) include thermosetting resins, thermoplastic resins, and ultraviolet-curing resins. Specific examples thereof include acrylic resin, epoxy resin, polyester resin, amino resin, urethane resin, furan resin, silicone resin, and modified products of these resins. Such synthetic resins of various polymerization degrees (molecular weights) may be used. Preferred among these are epoxy resin, dipentaerythritol hexaacrylate, epoxy acrylate, silicone resin, vinyl ester resin, polyvinyl butyral, and polyvinyl alcohol.

The amount of the component (c) is preferably 5 to 30 mass %, more preferably 10 to 20 mass % based on the total amount of solids. When the amount of the component (c) is less than 5 mass %, the effects of addition of the component (c) as described above may be less likely to be obtained. When the amount of the component (c) is more than 30 mass %, addition of a resin curing agent may be required and a film having a high hardness may not be obtained.

2.1.4. Component (d)

The component (d) is a triazine ultraviolet absorber having a SP value of 10 to 13.5 $(cal/cm^3)^{1/2}$. Examples of the triazine ultraviolet absorber include products of BASF SE, such as TINUVIN 400 (SP value: 11.0 $(cal/cm^3)^{1/2}$), TINUVIN 460 (SP value: 10.9 $(cal/cm^3)^{1/2}$), TINUVIN 479 (SP value: 11.3 $(cal/cm^3)^{1/2}$), and TINUVIN 477 (SP value: 11.4 $(cal/cm^3)^{1/2}$). The reason why use of a triazine ultraviolet absorber leads to good results is probably, but not certainly, because a triazine ultraviolet absorber has a high ultraviolet absorbability and good weather resistance.

2.1.5. Component (e)

The component (e) is the solvent of the colored film-forming application liquid and includes a non-aqueous solvent substantially having a SP value of 8 to 11.5 $(cal/cm^3)^{1/2}$. The phrase "a non-aqueous solvent substantially having a SP value of 8 to 11.5 $(cal/cm^3)^{1/2}$" means "a single non-aqueous solvent having a SP value of 8 to 11.5 $(cal/cm^3)^{1/2}$", "a solvent mixture having a SP value of 8 to 11.5 $(cal/cm^3)^{1/2}$ in which only non-aqueous solvents each having a SP value of 8 to 11.5 $(cal/cm^3)^{1/2}$ are combined", or "a solvent mixture having a SP value of 8 to 11.5 $(cal/cm^3)^{1/2}$ in which non-aqueous solvent(s) having a SP value of 8 to 11.5 $(cal/cm^3)^{1/2}$ and solvent(s) having a SP value out of the range of 8 to 11.5 $(cal/cm^3)^{1/2}$ are combined". The SP value of the solvent mixture containing two solvents, for example, a "solvent A" and a "solvent B", can be calculated from the following equation.

$$SP \text{ value of solvent mixture} = SP \text{ value of solvent } A \times \frac{\text{Mole number of solvent } A}{(\text{Mole number of solvent } A + \text{Mole number of solvent } B)} + SP \text{ value of solvent } B \times \frac{\text{Mole number of solvent } B}{(\text{Mole number of solvent } A + \text{Mole number of solvent } B)}$$

The ultraviolet absorber used in the present invention can be uniformly dispersed in the application liquid containing a solvent having a SP value of 8 to 11.5 $(cal/cm^3)^{1/2}$. This also enables uniform dispersion of the ultraviolet absorber in the resulting film. If the SP value of the solvent is less than 8, the hydrophobic ultraviolet absorber precipitates from the coat after application, thus providing an opaque film as a final product.

The application liquid of the present invention including a non-aqueous solvent substantially having a SP value of 8 to 10.5 $(cal/cm^3)^{1/2}$ has enhanced leveling properties. Such an application liquid is preferred because the coat can be leveled in a shorter time in the below-described leveling.

Examples of the non-aqueous solvent having a SP value of 8 to 11.5 $(cal/cm^3)^{1/2}$ include aromatic hydrocarbons such as toluene (SP value: 9.1 $(cal/cm^3)^{1/2}$) and xylene (SP value: 9.1 $(cal/cm^3)^{1/2}$), ester acetates such as ethyl acetate (SP value: 8.8 $(cal/cm^3)^{1/2}$) and butyl acetate (SP value: 8.7 $(cal/cm^3)^{1/2}$), ketones such as acetone (SP value: 9.1 $(cal/cm^3)^{1/2}$), methyl ethyl ketone (SP value: 9.0 $(cal/cm^3)^{1/2}$), methyl isobutyl ketone (SP value: 8.3 $(cal/cm^3)^{1/2}$), cyclohexanone (SP value: 9.8 $(cal/cm^3)^{1/2}$), and 2-heptanone (SP value: 8.5 $(cal/cm^3)^{1/2}$), glycol ethers such as 3-methoxy-3-methylbutanol (SP value: 10.5 $(cal/cm^3)^{1/2}$), 1-methoxy-2-propanol (SP value: 11.3 $(cal/cm^3)^{1/2}$), 1-ethoxy-2-propanol (SP value: 10.9 $(cal/cm^3)^{1/2}$), 3-methoxy butyl acetate (SP value: 8.8 $(cal/cm^3)^{1/2}$), and diethylene glycol monobutyl ether (SP value: 10.5 $(cal/cm^3)^{1/2}$), ethers such as THF (SP value: 8.3 $(cal/cm^3)^{1/2}$), cellosolves such as ethylene glycol monoethyl ether (SP value: 11.5 $(cal/cm^3)^{1/2}$), ethylene glycol mono-normal butyl ether (SP value: 10.8 $(cal/cm^3)^{1/2}$), and acetic acid 2-methoxy butyl (SP value: 9.0 $(cal/cm^3)^{1/2}$), chlorohydrocarbons such as dichloromethane (SP value: 10.2 $(cal/cm^3)^{1/2}$), and other substances such as N,N-dimethylformamide (SP value: 10.2 $(cal/cm^3)^{1/2}$). Preferred among these are ketones such as methyl ethyl ketone (SP value: 9.0 $(cal/cm^3)^{1/2}$), methyl isobutyl ketone (SP value: 8.3 $(cal/cm^3)^{1/2}$), cyclohexanone (SP value: 9.8 $(cal/cm^3)^{1/2}$), and 2-heptanone (SP value: 8.5 $(cal/cm^3)^{1/2}$) and glycol ethers such as 3-methoxy-3-methylbutanol (SP value: 10.5 $(cal/cm^3)^{1/2}$), 1-methoxy-2-propanol (SP value: 11.3 $(cal/cm^3)^{1/2}$), and 1-ethoxy-2-propanol (SP value: 10.9 $(cal/cm^3)^{1/2}$).

Examples of the solvent(s) having a SP value out of the range of 8 to 11.5 $(cal/cm^3)^{1/2}$ which is/are optionally contained in the application liquid of the present invention include n-hexane (SP value: 7.3 $(cal/cm^3)^{1/2}$), diethyl ether (SP value: 7.3 $(cal/cm^3)^{1/2}$), 2-methoxyethanol (SP value: 12.0 $(cal/cm^3)^{1/2}$), and carbon tetrachloride (SP value: 12.2 $(cal/cm^3)^{1/2}$).

2.1.6. Component (f) (Blue, Gray, or Pink Pigment)

Examples of the blue pigment include Pigment Blue 15, Pigment Blue 28, and cesium tungsten oxide (CWO) fine particles. Examples of the gray pigment include Pigment Black 26, Pigment Black 27, and Pigment Black 28. Examples of the pink pigment include Pigment Red 202, Pigment Red 122, and Pigment Violet 19. The average particle size D50 of the pigment is preferably 10 nm to 300 nm. A pigment having D50 of less than 10 nm tends to aggregate, whereas a pigment having D50 of greater than 300 nm tends to have poor permeability. In light of these, the average particle size D50 of the pigment is preferably 15 nm to 280 nm, more preferably 20 nm to 250 nm. The amount of the pigment in the colored film-forming application liquid is 0.02 to 0.50 times the mass of the ultraviolet absorber. If the amount is less than 0.02 times, the film tends to have poor color development, whereas if the amount is more than 0.50 times, the haze tends to increase. In light of these, the pigment in the colored film-forming application liquid is preferably 0.025 to 0.45 times, more preferably 0.03 to 0.36 times the mass of the ultraviolet absorber.

When the colored film 3 contains a blue pigment, the colored film 3 is blue in color. When the glass article 1 has the blue colored film 3, the center portion of the article preferably has a visible light transmittance of 70% or higher, and the article preferably has an average absorption in the wavelength range of 570 nm to 780 nm of 15% to 44%. If the average absorption in the wavelength range of 570 nm to 780 nm is less than 15% or more than 44%, the article is less likely to be blue in color, gray in color, or pink in color.

2.1.7. Other Components

The colored film-forming application liquid may contain fine particles of a conductive substance. The colored film-coated glass plate containing fine particles of a conductive substance can shield infrared rays. Examples of the conductive substance include indium tin oxide (ITO) and antimony-tin oxide (ATO). The amount of the fine particles of a conductive substance is 5 to 15 mass % based on the total amount of solids. The average particle size D50 thereof is 50 nm to 100 nm. The film-forming application liquid may contain other components in addition to the above components depending on the application. Examples of the other components include antifungal agents, photocatalytic materials, antirust agents, anticorrosives, algae control agents, water repellents, oil repellents, light stabilizers, antioxidants, substrate wetting agents, hydrophilic materials, and absorbent materials.

2.2. Application Step

In the application step, the colored film-forming application liquid may be applied to a main surface of the glass substrate 2 by a known method such as spin coating, dip coating, nozzle flow coating, curtain coating, roll coating, spray coating, blade coating, or coating with brushes. Preferred among these application methods are spray coating and nozzle flow coating, each of which easily forms the film thickness varying portion 31.

The glass article shown in FIG. 1 includes the uncoated portion 4 close to the upper edge 2a of the glass substrate 2, the boundary 51 between the colored film 3 and the uncoated portion 4, and the film thickness varying portion 31 where the colored film gradually tapers in thickness toward the boundary 51. In the nozzle flow coating, the colored film-forming application liquid is applied to the main surface of the glass substrate 2 which is vertically placed, for example, to keep the vertical direction of the substrate, starting from the portion close to the upper edge. The colored film-forming application liquid is applied and is gravitationally spread toward the lower edge 2d of the glass substrate 2. The thickness of the liquid film formed on the main surface of the glass substrate 2 increases toward the lower edge 2d. Thus, the film thickness varying portion 31 where the colored film gradually tapers in thickness toward the boundary 51 can be formed. The angle formed by the surface of the film thickness varying portion 31 with the main surface of the glass substrate 2 can be controlled by controlling the viscosity of the colored film-forming application liquid or the solids concentration (concentration of film-forming component) of the application liquid.

The surface of the film thickness varying portion 31 of the colored film forms an angle of preferably 0.0005° to 0.02° with the main surface of the glass substrate 2. If the angle is less than 0.0005°, the area of the thin film thickness region is large. This tends to lead to deterioration of the color development of the colored film 3. If the angle is greater than 0.02°, the boundary 51 tends to be noticeable. In light of these, the angle is preferably 0.0010° to 0.015°, more preferably 0.0015° to 0.010°.

The solids concentration may be controlled in the application liquid. Alternately, the solids concentration may be controlled by applying a film-forming component-free solvent as a base liquid to the main surface of the glass substrate 2 before application of the colored film-forming application liquid by the same method as the nozzle flow coating. When the film-forming component-free solvent is applied as a base liquid to the main surface of the glass substrate 2 by the same method as the above-described nozzle flow coating, a liquid film having a thickness that increases toward the lower edge 2d is obtained.

The colored film-forming application liquid is applied to the liquid film by the same method as the above-described nozzle flow coating. Thereby, a liquid mixture film in which the base liquid and the colored film-forming application liquid are mixed is formed on the main surface of the glass substrate 2. The solids concentration gradually decreases toward the lower edge 2d (hereinafter, this application method is referred to as "mixing method"). In the mixing method, the angle formed by the surface of the colored film 3 with the main surface of the glass substrate 2 is controlled by controlling the thickness of the "liquid mixture film" formed on the glass substrate 2 and the solids concentration.

The base liquid is selected depending on the type of the colored film-forming application liquid. The base liquid is preferably a solvent that can dilute the colored film-forming application liquid without curing or phase separating the liquid. The base liquid also preferably has a high wettability with the main surface of the glass substrate 2. For example, the base liquid preferably has a contact angle of 30° or less, more preferably 20° or less. The contact angle can be determined by the method according to the sessile drop method in JIS R 3257 (1999).

In addition, the base liquid preferably has a solubility parameter (SP value) closer to the SP value of the solvent in the colored film-forming application liquid. Preferably, the difference between the SP values is less than 1.5 $(cal/cm^3)^{1/2}$. If the difference between the SP values is 1.5 $(cal/cm^3)^{1/2}$ or more, the solids are less likely to be dissolved in the primary application liquid. This tends to cause precipitation or phase separation. In light of this, the difference between the SP values is preferably 1.0 $(cal/cm^3)^{1/2}$ or less, more preferably 0.5 $(cal/cm^3)^{1/2}$ or less.

The SP value is a commonly known solubility parameter which is an indicator of solubility or compatibility. The SP value may be calculated from heat of evaporation of liquid or determined based on the molecular structure by an estimation method such as Hansen's method, Hoy's method, Small's method, or Fedor's method. The present invention uses, for example, Fedor's estimation method disclosed in R. F. Fedors: Polym. Eng. Sci., 14(2), 147-154 (1974). The SP value specified in the present invention is determined at 25° C.

As described above, the base liquid is selected depending on the type of the colored film-forming application liquid. When the colored film-forming application liquid contains the component(s) listed in "2.1.5. Component (e)" as the solvent, the base liquid may be the same as the colored film-forming application liquid or may be selected to satisfy that the difference between the SP values is less than 1.5 $(cal/cm^3)^{1/2}$.

Figure 3:
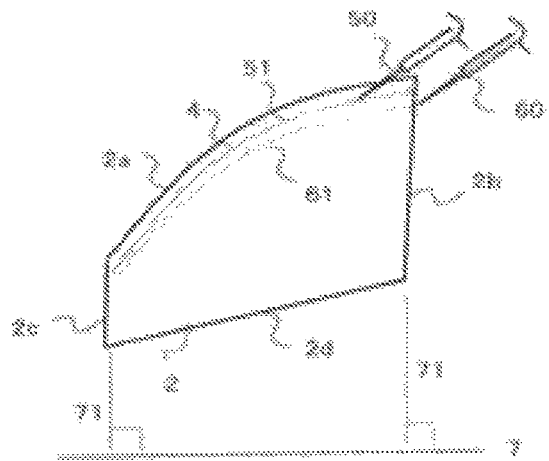
FIG. 3 is a schematic view illustrating an example of a method of applying a colored film-forming application liquid to a glass substrate 2 to obtain a glass article of the present invention.

In the case of the above-described nozzle flow coating, the width of the uncoated portion 4, that is, the distance between the upper edge 2a and the boundary 51 can be controlled by controlling the position to which the colored film-forming application liquid is applied. In one example of the application method, as shown in FIG. 3, the colored film-forming application liquid is discharged on the main surface of the glass substrate 2 from the outlet of the nozzle 50 for discharging the colored film-forming application liquid while the nozzle 50 is moved parallel or substantially parallel to the upper edge 2a of the glass substrate 2 (e.g., in a direction from the left edge 2c to the right edge 2b). This application method can provide the boundary 51 parallel or substantially parallel to the glass substrate edge (upper edge 2a) that faces the boundary across the uncoated portion. In one example of other application methods, the portion close to the edge face of the main surface of the glass substrate 2 is masked, and the colored film-forming application liquid is applied to the main surface. Also in such an application method, the boundary 51 is preferably parallel or substantially parallel to the glass substrate edge (upper edge 2a) that faces the boundary across the uncoated portion. The width of the uncoated portion 4 is preferably controlled to 0 (exclusive) to 10 mm or 0 (exclusive) to 5 mm.

Figure 4:
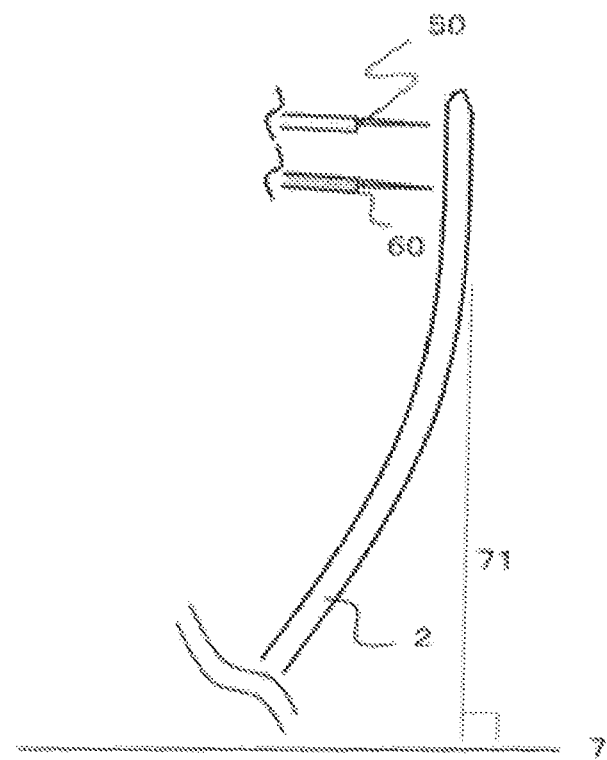
FIG. 4 is a side view of the glass substrate 2 and schematically illustrates a main part of an example of the vertical position of a nozzle for discharging the colored film-forming application liquid and a nozzle for discharging a base liquid.
Figure 5:
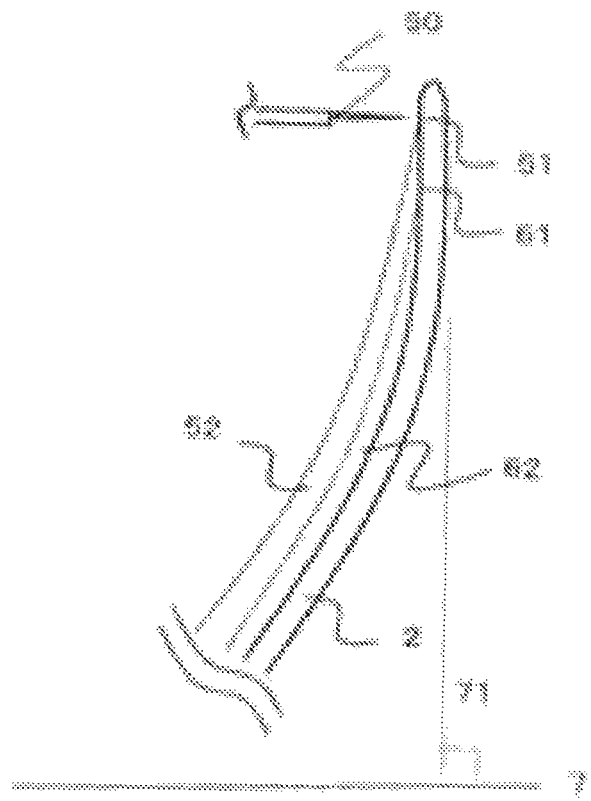
FIG. 5 is a side view of the glass substrate 2 and schematically illustrates application of the colored film-forming application liquid to a liquid film formed from the base liquid.

In the mixing method, the colored film-forming application liquid is discharged from the nozzle 50 on a region other than the region where the base liquid is applied as shown in FIGS. 4 and 5. This enables the formation of the colored film 3 including the film thickness varying portion 31 and a region 32 having a substantially flat film thickness distribution. Specifically, first, the base liquid is discharged on the main surface of the glass substrate 2 from the outlet of the nozzle 60 for discharging the base liquid while the nozzle 60 is moved parallel or substantially parallel to the upper edge 2a of the glass substrate 2 (e.g., in a direction from the left edge 2c to the right edge 2b). Thereby, a liquid film 62 of the base liquid is formed on the main surface of the glass substrate 2. Then, the colored film-forming application liquid is discharged from the nozzle 50 on a region other than the region where the liquid film 62 is formed, that is, a region between the upper edge 2a and the boundary 61 between the film thickness varying portion 31 and the region 32. Thereby, a liquid film 52 of the colored film-forming application liquid is formed. Thus, the colored film 3 including the film thickness varying portion 31 and the region 32 having a substantially flat film thickness distribution can be formed.

Figure 6:
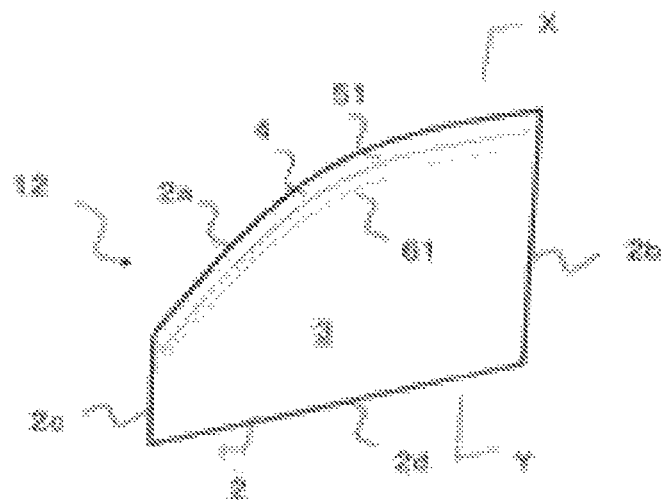
FIG. 6 is a schematic front view of a main part of a glass article according to a second embodiment of the present invention.
Figure 7:
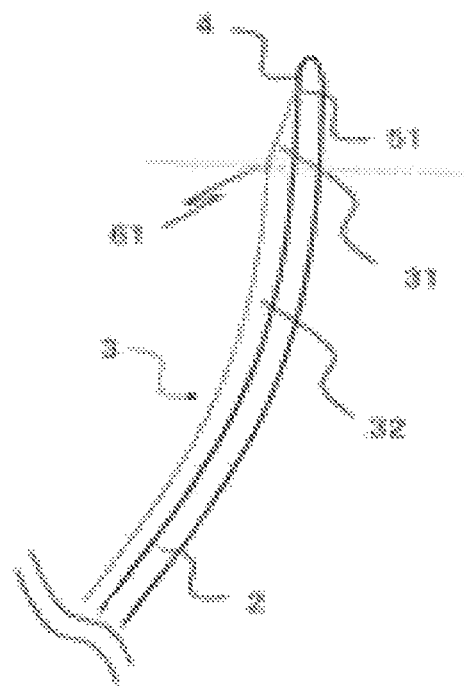
FIG. 7 is a schematic view of a main part of the X-Y cross section in FIG. 6.

The glass article having such a colored film is a glass article 12 according to a second embodiment. Needless to say, the glass article 12 according to the second embodiment is restricted by the features of the glass article 1 according to the first embodiment. FIG. 6 is a schematic front view of a main part of the glass article 12. FIG. 7 is a schematic view of a main part of the X-Y cross section in FIG. 6. The glass article 12 includes the glass substrate 2, the colored film 3, the uncoated portion 4, and the boundary 51. The colored film 3 includes the film thickness varying portion 31 and the region 32 having a substantially flat film thickness distribution. The film thickness varying portion 31 preferably has a width of 15 mm to 100 mm from the boundary 51. If the width is less than 15 mm, the boundary 51 tends to be noticeable. If the width is larger than 100 mm, a light color region tends to be large in the colored film 3. In light of these, the width is preferably 20 to 80 mm, more preferably 25 to 60 mm.

The region 32 includes the center portion of the glass article, and the thickness of the region is preferably 1.5 μm to 8 μm. When the thickness of the colored film is less than 1.5 μm, the color development of the film tends to be reduced. To maintain the color development requires an increase in the amount of the pigment, which is however likely to lead to poor durability of the film. When the thickness of the colored film is greater than 8 μm, the durability of the film tends to be reduced. In light of these, the thickness of the colored film is preferably 2 μm to 7 μm, more preferably 2.5 μm to 6 μm. The region 32 preferably has a film thickness standard deviation of 0.5 or less, more preferably, 0.3 or less. If the film thickness standard deviation is more than 0.5, optical distortion is likely to occur. Such a region tends not to satisfy the perspective distortion test and double image test of JIS R 3211 (revised 1998).

Needless to say, in an embodiment in which the uncoated portion 4 is formed on the main surface of the glass substrate, the effect of the present invention that the boundary 51 is less noticeable is significantly achieved. The glass article of the present invention may have another embodiment (third embodiment: not shown) in which no uncoated portion 4 which is visible on the glass article used as a window is formed on the main surface of the glass substrate. In the third embodiment, the boundary 51 is formed between the upper edge 2a and the main surface, and the upper edge 2a is the uncoated portion 4. The glass article of the present invention may also have another embodiment in which the uncoated portion 4 is formed on the portion close to the side edge 2b and/or the portion close to the side edge 2c. When the glass article is incorporated as a door glass in a vehicle, the uncoated portion 4 is preferably formed at least on the portion close to the upper edge 2a of the main surface of the glass substrate 2.

The other main surface opposite to the main surface on which the colored film 3 is formed is not taken into account as an uncoated portion even when no film is formed thereon. This is because the color of the glass article is dominated by the color of the colored film formed only on one side of the main surfaces.

2.3. Curing Step

The colored film-forming application liquid applied to the glass substrate 2 is cured by drying and/or heating to provide the colored film 3. Thus, the colored film-coated glass articles (1 and 12) are obtained. For example, the cured colored film 3 can be obtained by exposing the glass substrate 2 to which the colored film-forming application liquid is applied to heat and superheated steam at 100° C. to 350° C. To flatten the surface layer of the colored film-forming application liquid applied to the main surface of the glass substrate 2, leveling is preferably performed between the application step and the curing step by allowing the glass substrate 2 to which the colored film-forming application liquid is applied to stand.

EXAMPLES

The present invention is described in detail below based on the examples and comparative examples. The colored film-coated glass articles obtained in the examples and comparative examples in the present invention were evaluated by the following methods.

[Appearance]

Each glass article was visually observed and evaluated whether the color of a film-coated portion of the glass article and the boundary between an uncoated portion and a film thickness varying portion were noticeable or not.

[Film Thickness]

The thickness of a colored film of each colored film-coated glass plate was measured using Surfcorder ET4000A available from Kosaka Laboratory Ltd. Through this measurement, the angle formed by the surface of a film thickness varying portion with a main surface of a glass substrate and the thickness deviation of the region 32 of the film 3 were also determined.

[Visible Light Transmittance]

The visible light transmittance Tv of each colored film-coated glass plate was determined according to ISO 9050 using a spectrophotometer U-4100 available from Hitachi, Ltd.

Through this measurement, the average absorption in the wavelength range of 570 nm to 780 nm was also calculated. The average absorption was determined in the following way: the transmittance values were measured at 5-nm intervals in the wavelength range of 570 nm to 780 nm to determine an average transmittance on arithmetic average, and the resulting value was subtracted from 100. That is, the average absorption was determined from "100−average transmittance in the wavelength range of 570 nm to 780 nm".

[L*a*b* Color System]

The tristimulus values X, Y, and Z were calculated from the transmittance in the wavelength range of 380 nm to 780 nm of each colored film-coated glass plate according to JIS Z 8722 (2009) using a spectrophotometer U-4100 available from Hitachi, Ltd. The values X, Y, and Z were converted to the values in the CIE (1976) L*a*b* color system. The chroma c* was calculated from $[(a^*)^2+(b^*)^2]^{(1/2)}$.

Example 1

Preparation of Glass Substrate 2

A curved clear float glass plate, for used as an automotive door glass, having a curvature of 2500 R, a thickness of 3.1 mm, and a size of 943 mm×512 mm was used as the glass substrate 2. The glass substrate 2 in this example had an absorbance in the wavelength range of 380 nm to 780 nm of 0.013 or lower per mm of thickness.

Preparation of Base Liquid

As a base liquid, the same 2-heptanone as that for the solvent in a colored film-forming application liquid was used. The base liquid was able to be applied without liquid separation and did not volatilize until the primary application liquid was applied.

Preparation of Colored Film-Forming Application Liquid (Primary Application Liquid)

A reaction vessel was charged with 16.30 g of a 3-aminopropyltriethoxysilane liquid as a component (a). Then, 2.73 g of a boric acid ($H_3BO_3$) powder as a component (b) was added thereto (the amount of the component (b) was 0.6 mol per mole of the component (a)). These components were stirred at 23° C. for five minutes. Thereafter, 29.15 g of tetramethoxysilane as a component (c) was added thereto (the amount of the component (c) was 2.6 mol per mole of the component (a)) and then 5.35 g of epoxy resin CY232 available from NCX as a component (d) was added thereto (the amount of the component (d) was 18 mass % based on the total amount of solids). These components were reacted at 60° C. for 120 hours to prepare a viscous liquid. To the liquid were added 33.27 g of 2-heptanone (SP value: 8.5 $(cal/cm^3)^{1/2}$) and 8.79 g of 3-methoxy-3-methylbutanol (SP value: 10.5 $(cal/cm^3)^{1/2}$), which was a glycol ether, as solvents; 2.61 g of a triazine ultraviolet absorber TINUVIN 460 (SP value: 10.9 $(cal/cm^3)^{1/2}$) available from BASF SE as an ultraviolet absorber; 0.52 g of TINUVIN 292 as a light stabilizer; and 1 g of a pigment dispersant (solids concentration: 10%, phthalocyanine blue (Pigment Blue 15:4)). Thereby, a film-forming application liquid having a solids concentration of 29 mass % was prepared. The solvent in the application liquid had a SP value of 9.0 $(cal/cm^3)^{1/2}$. The resulting application liquid was a colored transparent liquid in which turbidity due to, for example, aggregation was not observed and the ultraviolet absorber TINUVIN 460 and the phthalocyanine blue (Pigment Blue 15:4) were uniformly dispersed. Not only in this example but also in all other examples, colored transparent application liquids were obtained in which turbidity due to, for example, aggregation was not observed and the ultraviolet absorber and the pigment were uniformly dispersed. In this example, the colored film-forming application liquid contained the ultraviolet absorber in an amount of 7.7 mass % based on the total amount of solids and the pigment in an amount 0.03 times the mass of the ultraviolet absorber.

Application of Colored Film-Forming Application Liquid to Glass Substrate

The glass substrate 2 was kept so that the side edges 2c and 2d were perpendicular to the reference line 7 in a horizontal direction (i.e., along the reference lines 71) as shown in FIG. 3 and so that the upper portions of the side edges 2c and 2d were perpendicular to the reference line 7 in a horizontal direction (i.e., along the reference lines 71) as shown in FIGS. 4 and 5. The nozzle 60 set 15 mm vertically below the upper edge 2a of the glass substrate was moved parallel to the outline of the upper edge 2a at a speed of 100 mm/sec. The base liquid was discharged from the 2 mmφ outlet of the nozzle 60 at a flow rate of 5 g/sec to be applied to the substrate.

In the main surface of the glass substrate 2 on which the base liquid was kept, the nozzle 50 set 10 mm vertically below the upper edge 2a of the glass substrate was moved parallel to the outline of the upper edge 2a at a speed of 100 mm/sec. The colored film-forming application liquid was discharged from the 2 mmφ outlet of the main nozzle 50 at a flow rate of 2 g/sec to be applied to the glass substrate.

Leveling of Applied Application Liquid

After the application, the substrate was placed so that the side edge on the lower edge side was vertical and allowed to stand for 20 minutes. Thereby, the application liquid was leveled.

Curing of Colored Film

After the leveling, the surface of the glass substrate was preheated for five minutes to raise the temperature to 180° C. After the preheating, the glass substrate was exposed to superheated steam at 180° C. for 10 minutes to perform curing. Thus, a colored film-coated glass article was obtained. In this example, the colored film-coated glass article 12 according to the second embodiment was obtained. The portion where the colored film 3 was formed was blue in color in the glass article 12, and the glass article 12 included the uncoated portion 4 where no colored film was formed on the portion close to the upper edge 2a of a main surface of a glass substrate, the boundary 51 between the colored film and the uncoated portion, the film thickness varying portion 31 where the colored film gradually tapered in thickness toward the boundary 51, and the region 32 having a substantially flat film thickness distribution.

The region 32 had a thickness of 4.5 μm and a standard deviation of 0.19. The angle formed by the surface of the film thickness varying portion with the main surface of the glass substrate was 0.003°. The central portion of the glass article 32 had an average absorption in the wavelength range of 570 nm to 780 nm of 34%, a visible light transmittance of 74%, and a value a* of −7.5 and a value b* of −9.6 in the L*a*b* color system. The boundary 51 was less noticeable in the glass article 12 of this example.

Example 2

The colored film-coated glass article 12 was obtained as in Example 1 except that a green float glass plate (thickness: 3.2 mm, visible light transmittance determined according to ISO 9050: 81.9%, solar radiation transmittance determined according to JIS R 3106: 63.2%, ultraviolet light transmittance determined according to ISO 9050: 29.5%, trading as MFL, available from Central Glass Co., Ltd.) was used as the glass substrate 2. The glass substrate 2 in this example had an absorbance in the wavelength range of 380 nm to 780 nm of 0.07 or lower per mm of thickness.

The portion where the colored film 3 was formed was blue in color in the glass article 12, and the glass article 12 included the uncoated portion 4 where no colored film was formed on the portion close to the upper edge 2a of a main surface of a glass substrate, the boundary 51 between the colored film and the uncoated portion, the film thickness varying portion 31 where the colored film gradually tapered in thickness toward the boundary 51, and the region 32 having a substantially flat film thickness distribution.

The region 32 had a thickness of 4.0 μm and a standard deviation of 0.25. The angle formed by the surface of the film thickness varying portion with the main surface of the glass substrate was 0.003°. The central portion of the glass article 32 had an average absorption in the wavelength range of 570 nm to 780 nm of 39%, a visible light transmittance of 75%, and a value a* of −8.3 and a value b* of −1.4 in the L*a*b* color system. The boundary 51 was less noticeable in the glass article 12 of this example.

Example 3

The colored film-coated glass article 12 was obtained as in Example 1 except that in the preparation of the colored film-forming application liquid, Pigment Green 7 (blue-green pigment) was used as a pigment dispersant, and the colored film-forming application liquid contained the above-described ultraviolet absorber in an amount of 9.0 mass % based on the total amount of solids and the pigment in an amount 0.10 times the mass of the ultraviolet absorber.

The portion where the colored film 3 was formed was blue in color in the glass article 12, and the glass article 12 included the uncoated portion 4 where no colored film was formed on the portion close to the upper edge 2a of a main surface of a glass substrate, the boundary 51 between the colored film and the uncoated portion, the film thickness varying portion 31 where the colored film gradually tapered in thickness toward the boundary 51, and the region 32 having a substantially flat film thickness distribution.

The region 32 had a thickness of 4.5 μm and a standard deviation of 0.20. The angle formed by the surface of the film thickness varying portion with the main surface of the glass substrate was 0.004°. The central portion of the glass article 32 had an average absorption in the wavelength range of 570 nm to 780 nm of 34%, a visible light transmittance of 76%, and a value a* of −16.4 and a value b* of −2.0 in the L*a*b* color system. The boundary 51 was less noticeable in the glass article 12 of this example.

Example 4

The colored film-coated glass article 12 was obtained as in Example 1 except that in the preparation of a colored film-forming application liquid, Pigment Black 26 (gray pigment) was used as a pigment dispersant, and the colored film-forming application liquid contained the above-described ultraviolet absorber in an amount of 7.6 mass % based on the total amount of solids and the pigment in an amount 0.13 times the mass of the ultraviolet absorber.

The portion where the colored film 3 was formed was gray in color in the glass article 12, and the glass article 12 included the uncoated portion 4 where no colored film was formed on the portion close to the upper edge 2a of a main surface of a glass substrate, the boundary 51 between the colored film and the uncoated portion, the film thickness varying portion 31 where the colored film gradually tapered in thickness toward the boundary 51, and the region 32 having a substantially flat film thickness distribution.

The region 32 had a thickness of 4.0 μm and a standard deviation of 0.21. The angle formed by the surface of the film thickness varying portion with the main surface of the glass substrate was 0.0030. The central portion of the glass article 32 had an average absorption in the wavelength range of 570 nm to 780 nm of 28%, a visible light transmittance of 73%, and a lightness L* of 89 and a chroma c* of 1 in the L*a*b* color system. The boundary 51 was less noticeable in the glass article 12 of this example.

Example 5

The colored film-coated glass article 12 was obtained as in Example 1 except that in the preparation of a colored film-forming application liquid, Pigment Red 202 (pink pigment) was used as a pigment dispersant, and the colored film-forming application liquid contained the above-described ultraviolet absorber in an amount of 7.6 mass % based on the total amount of solids and the pigment in an amount 0.08 times the mass of the ultraviolet absorber.

The portion where the colored film 3 was formed was pink in color in the glass article 12, and the glass article 12 included the uncoated portion 4 where no colored film was formed on the portion close to the upper edge 2a of a main surface of a glass substrate, the boundary 51 between the colored film and the uncoated portion, the film thickness varying portion 31 where the colored film gradually tapered in thickness toward the boundary 51, and the region 32 having a substantially flat film thickness distribution.

The region 32 had a thickness of 4.5 μm and a standard deviation of 0.21. The angle formed by the surface of the film thickness varying portion with the main surface of the glass substrate was 0.003°. The central portion of the glass article 32 had an average absorption in the wavelength range of 570 nm to 780 nm of 17%, a visible light transmittance of 75%, and a lightness L* of 89 and a chroma c* of 7 in the L*a*b* color system. The boundary 51 was less noticeable in the glass article 12 of this example.

Comparative Example 1

The colored film-coated glass article 12 was obtained as in Example 1 except that in the preparation of a colored film-forming application liquid, Pigment Green 36 (yellow-green pigment) was used as a pigment dispersant, and the colored film-forming application liquid contained the above-described ultraviolet absorber in an amount of 8.9 mass % based on the total amount of solids and the pigment in an amount 0.28 times the mass of the ultraviolet absorber.

The portion where the colored film 3 was formed was yellow-green in color in the glass article 12, and the glass article 12 included the uncoated portion 4 where no colored film was formed on the portion close to the upper edge 2a of a main surface of a glass substrate, the boundary 51 between the colored film and the uncoated portion, the film thickness varying portion 31 where the colored film gradually tapered in thickness toward the boundary 51, and the region 32 having a substantially flat film thickness distribution.

The region 32 had a thickness of 4.5 μm and a standard deviation of 0.20. The angle formed by the surface of the film thickness varying portion with the main surface of the glass substrate was 0.004°. The central portion of the glass article 32 had an average absorption in the wavelength range of 570 nm to 780 nm of 49% and a visible light transmittance of 73%. The boundary 51 was noticeable in the glass article 12 of this comparative example.

Comparative Example 2

The colored film-coated glass article 12 was obtained as in Comparative Example 1 except that a green float glass plate (thickness: 3.2 mm, visible light transmittance determined according to ISO 9050: 81.9%, solar radiation transmittance determined according to JIS R 3106: 63.2%, ultraviolet light transmittance determined according to ISO 9050: 29.5%, trading as MFL, available from Central Glass Co., Ltd.) was used as the glass substrate 2. The glass substrate 2 in this comparative example had an absorbance in the wavelength range of 380 nm to 780 nm of 0.07 or lower per mm of thickness.

The portion where the colored film 3 was formed was yellow-green in color in the glass article 12, and the glass article 12 included the uncoated portion 4 where no colored film was formed on the portion close to the upper edge 2a of a main surface of a glass substrate, the boundary 51 between the colored film and the uncoated portion, the film thickness varying portion 31 where the colored film gradually tapered in thickness toward the boundary 51, and the region 32 having a substantially flat film thickness distribution.

The region 32 had a thickness of 4.5 μm and a standard deviation of 0.21. The angle formed by the surface of the film thickness varying portion with the main surface of the glass substrate was 0.003°. The central portion of the glass article 32 had an average absorption in the wavelength range of 570 nm to 780 nm of 45% and a visible light transmittance of 74%. The boundary 51 was noticeable in the glass article 12 of this comparative example.

Comparative Example 3

The colored film-coated glass article 12 was obtained as in Example 1 except that in the preparation of a colored film-forming application liquid, Pigment Yellow 150 (yellow pigment) was used as a pigment dispersant, and the colored film-forming application liquid contained the above-described ultraviolet absorber in an amount of 7.6 mass % based on the total amount of solids and the pigment in an amount 0.17 times the mass of the ultraviolet absorber.

The portion where the colored film 3 was formed was yellow in color in the glass article 12, and the glass article 12 included the uncoated portion 4 where no colored film was formed on the portion close to the upper edge 2a of a main surface of a glass substrate, the boundary 51 between the colored film and the uncoated portion, the film thickness varying portion 31 where the colored film gradually tapered in thickness toward the boundary 51, and the region 32 having a substantially flat film thickness distribution.

The region 32 had a thickness of 4.5 μm and a standard deviation of 0.20. The angle formed by the surface of the film thickness varying portion with the main surface of the glass substrate was 0.004°. The central portion of the glass article 32 had an average absorption in the wavelength range of 570 nm to 780 nm of 12% and a visible light transmittance of 89%. The boundary 51 was noticeable in the glass article 12 of this comparative example.

Comparative Example 4

The colored film-coated glass article 12 was obtained as in Example 1 except that in the application of the colored film-forming application liquid to the glass substrate, the position of the nozzle 50 and the position of the nozzle 60 were vertically reversed, that is, the nozzle 60 was set 10 mm vertically below the upper edge 2a of the glass substrate 2 and the nozzle 50 was set 15 mm vertically below the upper edge 2a of the glass substrate 2.

The portion where the colored film 3 was formed was blue in color in the glass article 12, and the glass article 12 included the uncoated portion 4 where no colored film was formed on the portion close to the upper edge 2a of a main surface of the glass substrate, the boundary 51 between the colored film and the uncoated portion, and the region 32 having a substantially flat film thickness distribution, but did not include the film thickness varying portion 31 where the colored film gradually tapered in thickness toward the boundary 51.

The center portion of the glass article had a thickness of 4.5 μm, an average absorption in the wavelength range of 570 nm to 780 nm of 34%, and a visible light transmittance of 73%. The boundary 51 was noticeable in the glass article 12 of this comparative example.

INDUSTRIAL APPLICABILITY

The glass articles of the present invention are usable for applications in which an uncoated portion is visible. For example, they are usable as glass windows of door glasses in vehicles or glass walls or glass ribs in buildings.

REFERENCE SIGNS LIST

1 glass article
2 glass substrate
3 colored film
31 film thickness varying portion
4 uncoated portion
51 boundary between film thickness varying portion and uncoated portion

The invention claimed is:

1. A colored film-coated glass article that is to be incorporated as a window in a vehicle, the glass article comprising:
   a glass substrate having main surfaces, an upper edge, and a lower edge;
   a colored film formed on one of the main surfaces of the glass substrate;
   an uncoated portion formed on a portion of the one of the main surfaces where the colored film is not formed or on an edge face of the glass substrate;
   a boundary between the colored film and the uncoated portion; and
   a film thickness varying portion where the colored film gradually tapers in thickness toward the boundary,
   the uncoated portion being visible in the glass article used as a window,
   the glass substrate having an absorbance in the wavelength range of 380 nm to 780 nm of 0.10 or lower per mm of thickness,
   the portion where the colored film is formed being blue in color, gray in color, or pink in color in the glass article,
   wherein:
   the uncoated portion is formed on a portion of the glass substrate that is close to the upper edge of the glass substrate and continuous with the upper edge of the glass substrate and has a width in a range from greater than 0 mm to 10 mm,
   a surface of the film thickness varying portion of the colored film forms an angle of 0.0010° to 0.015° with the one of main surfaces of the glass substrate, and
   the film thickness varying portion of the colored film has a width ranging from 15 mm to 100 mm from the boundary.

2. The colored film-coated glass article according to claim 1, wherein the glass article is blue in color and includes a center portion that has a chromaticity in the L*a*b* color system satisfying a*<0 and b*<0.

3. The colored film-coated glass article according to claim 1, wherein the glass article is gray in color and includes a center portion that has a lightness and a chroma in the L*a*b* color system satisfying 85<L*<90 and c*<7, respectively.

4. The colored film-coated glass article according to claim 1, wherein the glass article is pink in color and includes a center portion that has a lightness and a chroma in the L*a*b* color system satisfying 88<L*<93 and c*<10, respectively.

5. The colored film-coated glass article according to claim 1, wherein the center portion of the glass article has a visible light transmittance of 70% or higher.

6. The colored film-coated glass article according to claim 1, wherein the glass article has an average absorption in the wavelength range of 570 nm to 780 nm of 15% to 44%.

7. The colored film-coated glass article according to claim 1, wherein the colored film in the center portion of the glass article has a thickness of 1.5 μm to 8 μm.

8. The colored film-coated glass article according to claim 1, wherein the glass article includes an uncoated portion where no colored film is formed which is present in part of the one of main surfaces of the glass substrate, and the boundary is parallel or substantially parallel to a glass substrate edge that faces the boundary across the uncoated portion.

* * * * *